United States Patent [19]

Eaton

[11] Patent Number: 5,649,315
[45] Date of Patent: Jul. 15, 1997

[54] METHOD FOR SELECTING BETWEEN FIRST, SECOND AND THIRD BATTERY SAVING PERIODS IN A SELECTIVE CALL

[75] Inventor: Eric Thomas Eaton, Lake Worth, Fla.

[73] Assignee: Motorola, Inc., Schaumburg, Ill.

[21] Appl. No.: 531,505

[22] Filed: Sep. 21, 1995

[51] Int. Cl.$^6$ .................................................. H04B 1/16
[52] U.S. Cl. ..................... 455/343; 455/38.3; 340/825.44
[58] Field of Search ................................ 455/343, 38.1, 455/38.3, 54.1; 340/825.44, 311.1

[56] References Cited

U.S. PATENT DOCUMENTS

| | | | |
|---|---|---|---|
| 4,398,192 | 8/1983 | Moore et al. | 340/825.44 |
| 4,422,162 | 12/1983 | Davis et al. | 365/227 |
| 4,668,949 | 5/1987 | Akahori et al. | 340/825.47 |
| 4,860,003 | 8/1989 | DeLuca et al. | 340/825.44 |
| 4,897,835 | 1/1990 | Gaskill et al. | 370/94.1 |
| 5,128,932 | 7/1992 | Li | 370/60 |
| 5,150,954 | 9/1992 | Hoff | 340/825.44 |
| 5,230,084 | 7/1993 | Nguyen | 455/343 |
| 5,325,088 | 6/1994 | Willard et al. | 340/825.2 |
| 5,382,949 | 1/1995 | Mock et al. | 455/343 |
| 5,423,057 | 6/1995 | Kuznicki et al. | 455/38.3 |
| 5,459,457 | 10/1995 | Sharpe | 455/343 |

OTHER PUBLICATIONS

"Semi–Distributed Addressing, a New Concept for ERMES Radio Protocol" dated May 11, 1989 by an unknown author.
"Sub–addressing, a Battery Saving Method" dated Mar. 16, 1989 by an unknown author.

*Primary Examiner*—Edward F. Urban
*Attorney, Agent, or Firm*—Keith A. Chanroo

[57] ABSTRACT

A selective call receiver (130) for conserving power having a first battery saving period, has a receiver (504) for receiving and obtaining synchronization to selective call signals having a multiplicity of frames. A synchronizer (602, 604) determines a first occurrence of a preassigned frame (200) of the multiplicity of frames. The receiver (504) receives the preassigned frame (200), each of frame designating a system collapse value for selecting a second battery saving period, and a TD collapse bit (406) and a TD collapse value (408) for designating a third battery saving period. A decoder/controller (506) decodes the TD collapse bit (406), the TD collapse value (408) and the system collapse value transmitted in the selective call signals. The decoder/controller (506) calculates the third battery saving period from the TD collapse value (408) and a battery save selector (616) selects the third battery saving period designated by the TD collapse value (408) when the TD collapse bit (406) is set.

12 Claims, 4 Drawing Sheets

METHOD FOR SELECTING BETWEEN FIRST, SECOND AND THIRD BATTERY SAVING PERIODS IN A SELECTIVE CALL

FIELD OF THE INVENTION

This invention relates in general to selective call receivers, and more specifically to a selective call receiver for selecting battery saving period.

BACKGROUND OF THE INVENTION

Prior art selective call receiver systems (paging systems) have endeavored to efficiently communicate information to selective call receivers (pagers) while providing for effective battery saving operation of the selective call receivers. One prior art protocol provides a preamble signal which initially synchronizes the selective call receivers to a paging signal. One of the several well known preamble signals may be used, each identifying a different group of selective call receivers which are used to decode message information.

The operation of the prior art signaling system requires selective call receivers to synchronously decode the received signal subsequent to being synchronized to the paging signal. The paging signal transmission may begin asynchronously, and once the transmission begins, the signal is synchronously decoded until the transmission ends. The paging transmission has at least one batch, each batch beginning with a synchronization signal followed by eight frames, each frame occurring at a predetermined time after the synchronization signal. A selective call receiver synchronized to the signal needs to search for its address in only a predetermined one of the eight frames. In the remaining seven frames, the selective call receiver conserves power by one of the well known techniques of battery saving. However, subsequent transmissions the paging signals, need not be either bit or frame synchronized to the previous paging transmission. By permitting a subsequent transmission signal to be synchronized only with each transmission, and not by bit or frame synchronization, the subsequent transmission is asynchronously synchronized to the paging signal.

It is desirable to provide battery saving features for the selective call receiver during the absence of a signal being directed to the selective call receiver. This has typically been accomplished with a preamble signal preceding the message transmission. The transmissions begin with a long preamble signal providing for selective call receiver synchronization before the message transmission and providing for battery saving in the absence thereof. The preamble signal although providing for battery saving and synchronization, decreases the overall system message throughput. During the time taken for a preamble transmission, no message information can be communicated to the selective call receivers, thereby decreasing throughput of the system.

Synchronous selective call receiver protocols eliminate any preamble signal, thereby enabling a more efficient battery savings. A synchronous paging signal synchronous signal divides selective call receivers into one of a plurality of group fields, each group field occurring at a predetermined period and having a predetermined maximum message information capacity. Since the synchronous signal is always being transmitted, no preamble signals are required, and a selective call receiver needs only decode paging information while its preassigned group is being transmitted. However, varying traffic demands (the amount of message information for a group of selective call receivers) may cause the amount of message information for one group of selective call receivers to exceed the maximum capacity of the group field while another group field has available capacity. This causes transmission of idle signals during one group field, while in another group field, numerous messages are being queued because its capacity is exceeded. The throughput of the overall system is decreased because selective overload patterns are generated from the varying traffic levels within different group fields.

Thus, what is needed is a selective call system which is able to optimize or select different battery saving cycles or period for determined selective call receivers to maximize the throughput of the system during varying traffic demands and to extend battery life of the selective call receivers.

DESCRIPTION OF A PREFERRED EMBODIMENT

Figure 1:
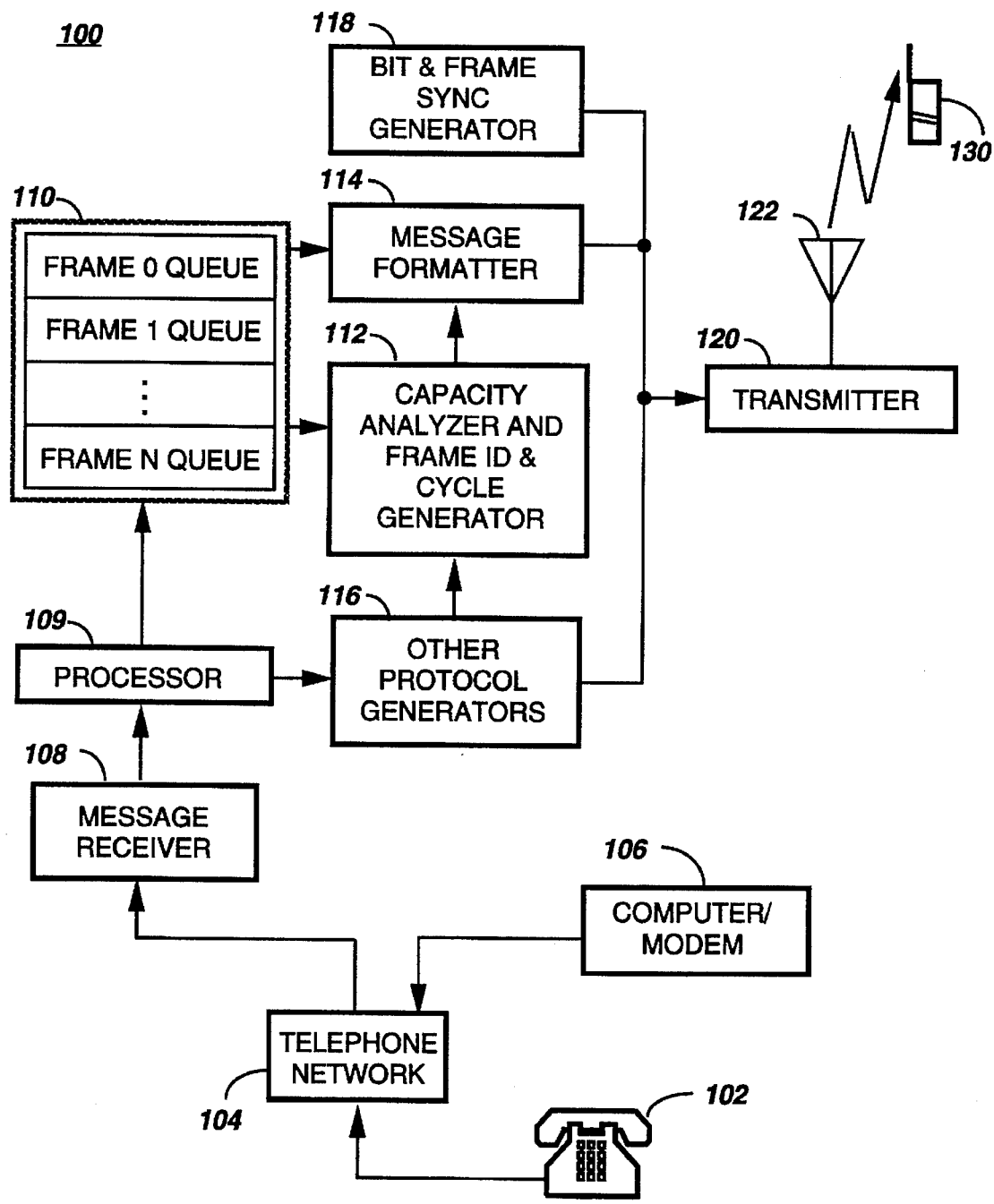
FIG. 1 is an electrical block diagram of a selective call system generating a selective call signal in accordance with a preferred embodiment of the present invention.

FIG. 1 shows an electrical block diagram of a selective call system generating a selective call (paging) signal in accordance with the preferred embodiment of the present invention. The functions of the selective call (paging) system 100 is preferably implemented within software, for example within a MODAX 500 Radio Paging Terminal which is manufactured by Motorola Inc. To send a message or page, a subscriber uses a telephone 102 for initiating a transmission of the selective call message. As is well known, the telephone 102 couples to the selective call system 100 via a telephone network 104, the operation of which is well known to one of ordinary skill in the art. Similarly, a computer/modem 106 is also coupled to the telephone network 104 for entering information, for example alphanumeric messages. The telephone network 104 couples to a message receiver 108 which receives messages to be transmitted to a plurality of selective call receivers 130 typically from the public switched telephone network 104. A processor 109, coupled to the message receiver 108, determines an appropriate protocol and address for encoding the message. If the processor 109 determines that the message is not to be sent via the signal format of the present invention, it passed to one of another protocol generator 116 which can include Golay Synchronous Code (GSC) and POCSAG (Post Office Standardisation Signaling Advisory Group) protocol generators well known to one of ordinary skill in the art. Messages to be transmitted on the protocol of the present invention are stored in a frame queue buffer 110 which has queues for the corresponding frames of the signal, and according to the preferred embodiment of the present invention, the corresponding number of frames N is 127. The predetermined frame identification (ID) of the selective call receiver 130 corresponding to the message is determined and the message is stored in the corresponding frame queue. A capacity analyzer and frame ID/cycle generator 112 determine the sequence of frame IDs to be transmitted, analyze the capacity of each frame and determine the cycle value to be used. The capacity analyzer 112 is also responsive to other protocols being transmitted. For example, if the expected occurrence of a frame is to be replaced by the transmission of one of the other protocols (thereby diminishing the capacity of the frame), the capacity analyzer 112 can account for this with the determined cycle value. A bit and frame sync generator 118 synchronously generates bit and frame synchronization signals. A message formatter 114 determines, in response to the address of selective call receivers 130 and the frame queue, the frame which the messages is be included. The messages are then formatted for transmission. A transmitter 120 accepts signals from blocks 118, 114 and 112 and modulates and transmits radio frequency selective call signals to selective call receiver(s) 130 via antenna 122 in a manner well known to those of ordinary skilled in the art.

Figure 2:
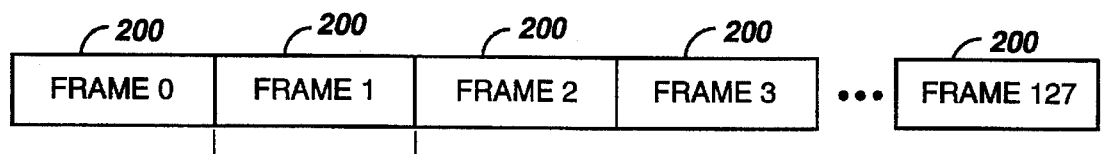
FIGS. 2–4 are timing diagrams of a synchronous signal in accordance with the preferred protocol for transmitting selective call messages according to FIG. 1.
Figure 3:
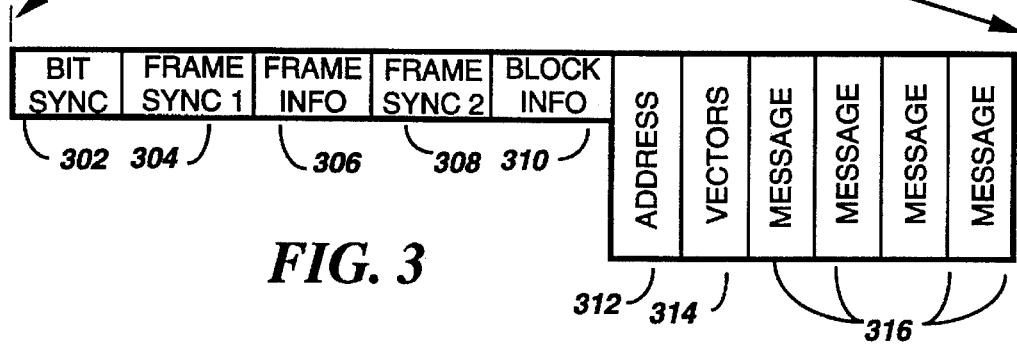
Figure 4:
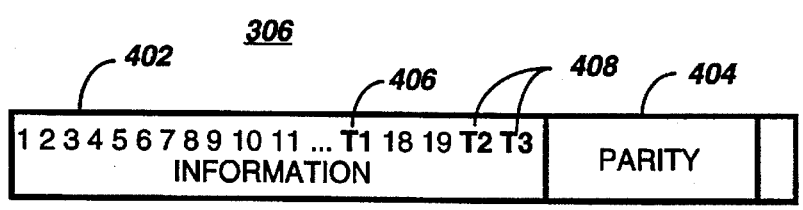

FIGS. 2–4 show timing diagrams of a synchronous signal in accordance with the preferred protocol for transmitting selective call messages according to FIG. 1. Referring to FIG. 2, the selective call (paging) signal comprises of a number of, preferably one-hundred-twenty-eight (128), message packets or frames 200. Each frame 200 is preferably 1.875 seconds in duration and has a preferred base data rate of 6400 bits per second. Although, it will be appreciated that other data rates can be used including the ability to use multiple data rates. Referring to FIG. 3, each frame comprises of a bit sync signal 302, preferably 32 bits of alternating 1,0 pattern, followed by a frame sync #1 signal 304 preferably one of several predetermined thirty-two bit words, and a frame info signal 306, preferably one thirty-two bit word having twenty-one variable information bits containing information such as a cycle number and a frame number. The bit sync signal 302 provides bit synchronization to the selective call receiver(s) 130 while the frame sync signal 304 provides frame synchronization and includes a signal indicative of the data rate of the message information, the details will be discussed below.

Following the frame info word 306 is a frame sync #2 308. Following the frame sync #2 308 is a block info word signal 310 including information such as the number of priority addresses, end of block information field, vector start fields and the system collapse value mask. The system collapse mask is the same for each 128 flames of a selective call transmission, and is used by the selective call receiver to operate in another battery saving mode or period different from the battery saving mode or period preprogrammed in the selective call receiver 130. The code word of each frames 200 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. The addresses are located in block 312 and the vectors pointing to the messages, if applicable, are located in block 314 and the messages are located in the remaining blocks 316. Preferably, all of the address signals within the frame are located in a first portion 312 and the information signals are located in a subsequent portion of the block 316. It is well known to those skilled in the art how the locate addresses in a first portion 312 and message information 316 in a second portion of the frame 200. Words 312–316 are shown in a vertical orientation to indicate that these words may be interleaved in order to improve the immunity of the transmission to burst errors. It is understood by one of ordinary skill in the art that interleaving may be modified or eliminated.

Referring to FIG. 4, a detailed block diagram of the frame information word is illustrated. The frame info word 306 includes an information block 402 and a parity block 404. The information block includes twenty-one bits and according to the preferred embodiment of the present invention, bit 17 is the TD collapse bit 406 and bits 20 and 21 indicate the TD collapse bits 408. The presence of the TD collapse bit 406 indicates whether the new and improved (third) battery saving mode or period will be used according to the present invention, the details will be discussed below. If the TD collapse bit 406 is set to a predetermined value, for example a digital "one", then the value of the TD collapse bits 408 set a new (third) battery saving period which overrides the selective call receiver's (first) battery saving mode and the system's (second) battery saving mode automatically, the details will be discussed below.

In this way, by transmitting a TD collapse bit, the selective call receiver is instructed to disregard previous preprogrammed method of selecting battery saving modes and to select the second (system) battery saving mode being transmitted in block info word. However, before selecting the second (system) battery saving mode, when the selective call receiver determines that the TD collapse bit is set, it automatically checks if a TD collapse value is sent, and if so, the selective call receiver uses the TD collapse value to operate in a third battery saving mode independent of the first and second battery saving mode.

Figure 5:
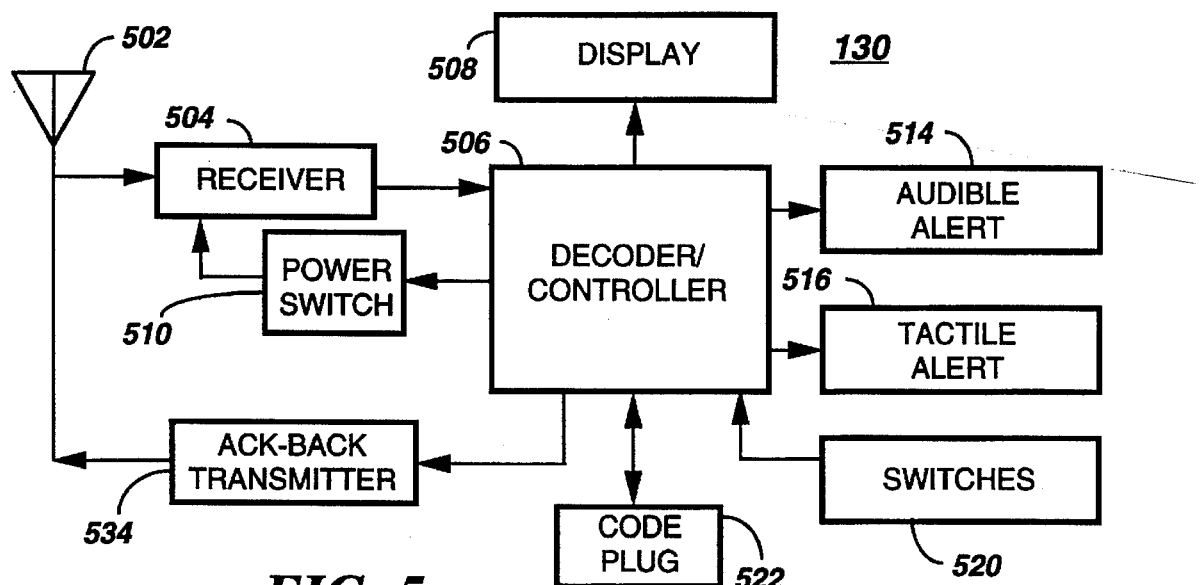
FIG. 5 is an electrical block diagram of a battery operated selective call receiver operating in accordance with the preferred embodiment of the present invention.

Referring to FIG. 5, an electrical block diagram of a selective call receiver is shown in accordance with the preferred embodiment of the present invention. The selective call receiver 130 comprises an antenna 502 for intercepting transmitted radio frequency (RF) signals which are coupled to the input of a receiver 504. The RF signals are preferably selective call (paging) message signals which provide, for example, a receiver address and an associated message, for example as alphanumeric. However, it will be appreciated that other well known paging signaling formats, such as tone only signaling or tone, numeric or voice signaling, would be suitable for use as well. The receiver 504 processes the RF signal and produces at the output a data stream representative of a demodulated data information. The demodulated data information is coupled into the input of a decoder/controller 506 which processes the information in a manner well known in the art. An ack-back transmitter 534 is coupled to the antenna 502 and the decoder/controller 506 for providing acknowledgment. A power switch 510, coupled to the decoder/controller 506, is used to control the supply of power to the receiver 504, thereby providing a battery saving function or for changing the battery saving mode among the first (pager), the second (system) and the third battery saving modes.

For purposes of this illustration, it will be assumed that the FLEX ™ signaling format although other signaling formats could be utilized as well. When the receiver becomes bit and frame synchronized and the address is received by the decoder/controller 506, the received address is compared with one or more addresses stored in a code plug (memory) 522, and when a match is detected, an alert signal is generated to alert a user that a selective call message, or page, has been received. The alert signal is directed to an audible alerting device 514 for generating an audible alert or to a tactile alerting device 516 for generating a silent vibrating alert. Switches 520 allow the user of the selective call receiver to, among other things, select between the audible alert 514 and the tactile alert 516 in a manner well known in the art.

The message information which is subsequently received is stored in memory 620 (FIG. 6) and can be accessed by the user for display using one or more of the switches 520 which provide such additional functions as reset, read, and delete, etc. Specifically, by the use of appropriate functions provided by the switches 520, the stored message is recovered from memory and processed by the decoder/controller 506 for displaying by a display 508 which enables the user to view the message. The receipt of the message by the selective call receiver 130 can automatically generate the ack-back response to the selective call base station to inform it that the message was successfully received. Preferably, the user will have the opportunity to input a message by using switches 520 or some other input devices well known to one of ordinary skilled in the arts. When the message is entered, the decoder/controller 506 processes the message by encoding an addressed derived from the received message to generate the ack-back response. The encoded ack-back response is then transmitted to the selective call base station that originated the paging message by techniques well known to one of ordinary skill in the art.

Figure 6:
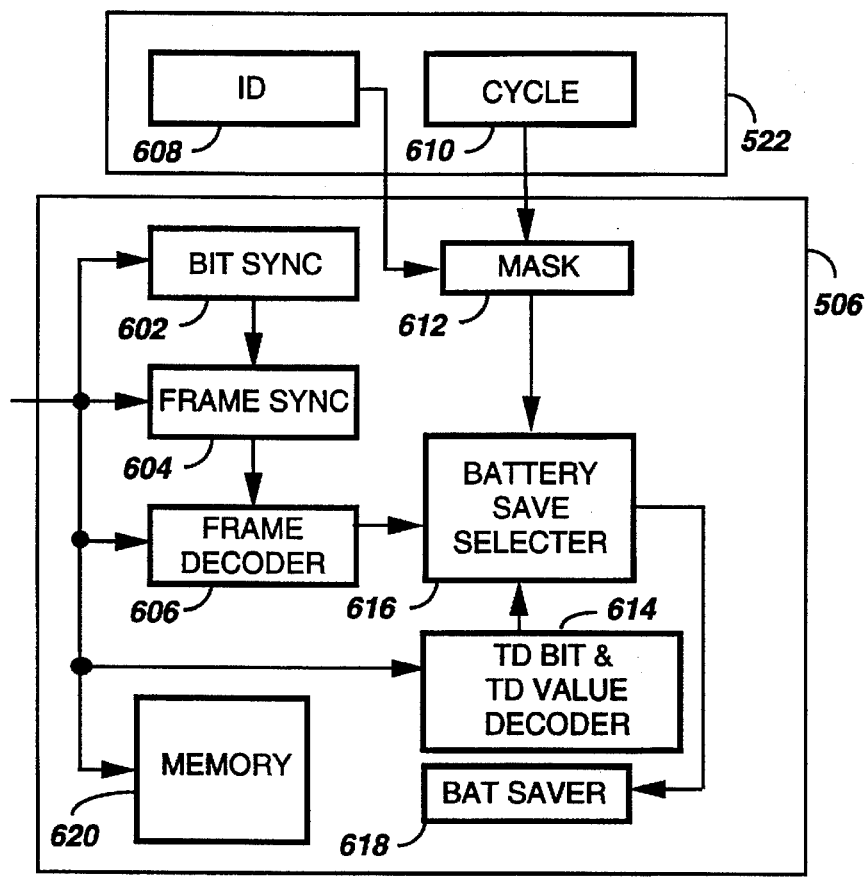
FIG. 6 is a more detailed electrical block diagram of the decoder/controller of the selective call receiver according to FIG. 5.

FIG. 6 shows a more detailed electrical block diagram of the decoder/controller of the selective call receiver according to FIG. 5. The decoder/controller 506 preferably includes a frame decoder 606 for identifying the received frames or packets. A bit sync (synchronizer) 602 uses the bit sync block 302 to obtain bit synchronization to the paging signal and the frame sync (synchronizer) 604 uses the frame sync #1, #2 304, 308 to obtain frame synchronization to the paging signal in a manner known to one of ordinary skill in the art. The code plug 522 has a predetermined frame ID 608, a predetermined cycle value 610, and a predetermined address assigned to the selective call receiver 130, as well as other signals which configure the selective call receiver 130 for desired operating characteristics. The predetermined cycle value 610 allows one selective call receiver 130 to be assigned to a plurality of frames. The predetermined frame ID 608 is masked with the predetermined cycle value 610 to generate a mask 612 indicative of a first period of reception of the selective call receiver and is used by a battery save selector 616 to enable battery saver 618 to produce a first period of reception. The battery saver 618 deactivates receiver 504 via the power switch 510 (FIG. 5) for certain frames thereby conserving battery power.

When the selective call receiver 130 receives the frame info 306, a TD bit and TD value decoder (TD decoder) 614 receives the TD collapse bit 406 and the TD collapse value 408 which are used by the battery save selector 616 to select the third or second period of reception (battery save period). The TD decoder 614 also receives the system collapse value from the block info word 310 to determine the second period of reception (battery save mode or period). A memory 620 stores control information and messages.

In this way, the TD collapse bit causes the selective call receiver to select a third battery saving mode (or period) determined from the TD collapse value. However, if the TD collapse value is absent, the selective call receiver uses the system collapse value to select in the second battery saving period. Alternatively, when the TD collapse bit is not set, the selective call receiver selects the more frequent battery saving period between the first and second battery saving periods.

Figure 7:
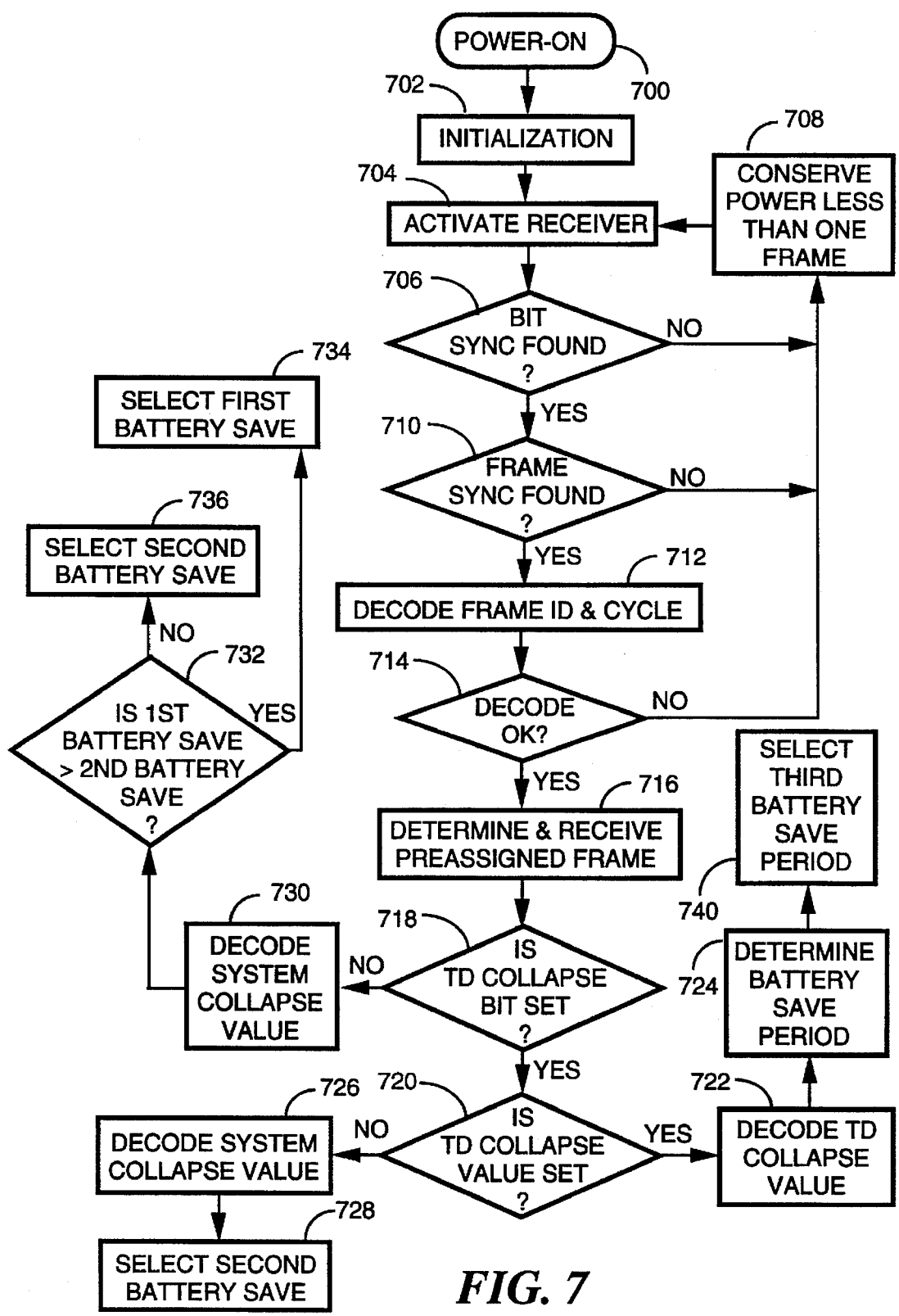
FIG. 7 a flow diagram of the selective call receiver of FIG. 5 illustrating the steps of selecting battery saving periods in accordance with the preferred embodiment of the present invention.

Referring to FIG. 7, a flow diagram illustrating the operation of the selective call receiver for selecting battery saving period accordance with the present invention. When power is turned-on, step 700, the selective call receiver 130 goes through its initialization phase, step 702. Once the selective call receiver 130 is initialized, the receiver is activated, step 704, and the receiver begins to search for bit sync 302 to acquire bit synchronization to the paging signal, step 706. When bit synchronization is obtained, the receiver searches for frame sync 304, 308 to obtain frame synchronization, step 710. If bit sync is not found in step 706 or frame sync in not found in step 710, then the selective call receiver 130 conserves battery power for less than one frame to begin searching again, step 708.

When frame sync is found in step 710, the selective call receiver 130 decodes frame ID and frame cycle, step 712 and in step 714, the selective call receiver 130 determines if the frame ID and frame cycle were decoded correctly, step 716. If not, the selective call receiver 130 battery save for less than one frame time, step 708, to begin searching for the frame ID and frame cycle. When the frame ID and frame cycle are decoded correctly, step 714, the selective call receiver 130 determines the first occurrence of its preassigned frame and, if applicable, battery save until the first occurrence of its preassigned frame arrives and begins receiving information, step 716.

The TD decoder 614 receives the frame info 306 and decodes bit 406 to determine whether the TD collapse bit is set and bits 408 to determine the presence of the TD collapse value 408. The TD collapse bit 406 is decoded in step 718, and if the TD collapse bit is set, for example to a binary "one", the selective call receiver searches for the TD collapse value 408, step 720, and if a TD collapse value is present, the TD decoder 614 decodes the TD collapse value 408, step 722 and uses the TD collapse value to determine (or calculate) the period for the third battery save period, step 724. According to the preferred embodiment of the present invention, the third battery saving period is determined by using a look-up table with the value to the TD collapse value to determine a number, N and calculating the battery saving period as $2^N$. The third battery saving period could also be determined by masking the TD collapse bits with the system collapse value and/or the pager collapse value. The scope of the invention is in no way limited to the number of bits used to transmit the TD collapse value 408 or the method, for example, addition, subtraction, multiplication, division, exclusive OR'ing, sending the actual TD collapse value or any other method used to determine the TD collapse value. Once the third battery saving period is determined, the battery save selector 616 selects the third battery saving period to determine the next fame, step 740.

Alternatively, when the TD collapse value 408 is absent (not set), step 720, the TD decoder 614 decodes the system collapse value from the block info word 310, step 726, and the battery save selector 616 selects the system (second) battery saving period to determine the next frame to receive, step 728. Also, if the TD collapse bit is not set, step 718, the TD decoder 614 decodes the system collapse value from the block info 310, step 730. The selective call receiver 130 compares the selective call receiver (first) battery saving period with the system (second) battery saving period, step 732 and the battery save selector 616 selects the more frequent battery saving period between the first and second battery save periods to determine the next frame to receive. For example, when the first battery saving period is more frequent than the second battery save period, the battery save selector 616 selects the first battery saving period, step 734, and when the second battery period is more frequent than the first battery save period, the battery save selector 616 selects the second battery saving period, step 736.

In this way, the TD collapse bit causes the selective call receiver to select a third battery saving mode (or period) determined from the TD collapse value. However, if the TD collapse value is absent, the selective call receiver uses the system collapse value to select in the second battery saving period. Alternatively, when the TD collapse bit is not set, the selective call receiver selects the more frequent battery saving period between the first and second battery saving periods.

Although more than embodiment of the invention has been described by way of example, other modifications may be made to the description herein, while remaining within the spirit of the present invention.

In summary, a selective call receiver conserves power and has a first battery saving period which comprises a receiver for receiving and obtaining synchronization to selective call signals having a multiplicity of frames. A synchronizer determines a first occurrence of a preassigned frame of the multiplicity of frames. The receiver receives the preassigned frame of the multiplicity of frames, each of the multiplicity of frames designating a system collapse value for selecting a second battery saving period. A TD collapse bit and a TD collapse value designate third battery saving period. A decoder/controller decodes the TD collapse bit, the TD collapse value and the system collapse value transmitted in the selective call signals. The decoder/controller also calculates the third battery saving period from the TD collapse value and a battery save selector selects the third battery saving period designated by the TD collapse value when the TD collapse bit is set. The battery save selector also selects the second battery saving period when the TD collapse bit is set and the TD collapse value is absent.

I claim:

1. In a selective call receiver for conserving power having a first battery saving period, a method for selecting battery saving periods, comprising the steps of:

receiving and obtaining synchronization to selective call signals having a multiplicity of frames;

determining a first occurrence of a preassigned frame of the multiplicity of frames;

receiving the preassigned frame of the multiplicity of frames, each of the multiplicity of frames has a system collapse value for designating a second battery saving period, and a TD collapse bit and a TD collapse value for designating third battery saving period;

decoding the TD collapse bit, the TD collapse value and the system collapse value being transmitted in the selective call signals;

calculating the third battery saving period from the TD collapse value; and selecting between the second battery saving period and the third battery saving period in response to the TD collapse value and the TD collapse bit.

2. The method according to claim 1 wherein the step of selecting selects the second battery saving period when the TD collapse bit is set and the TD collapse value is absent.

3. The method according to claim 1 wherein the step of selecting selects the first battery saving period when the first battery saving period is more frequent than the second battery saving period and when the TD collapse bit is not set.

4. The method according to claim 1 wherein the step of selecting selects the second battery saving period when the second battery saving period is more frequent than the first battery saving period and when the TD collapse bit is not set.

5. The method according to claim 1 wherein the step of selecting selects the third battery saving period designated by the TD collapse bit value when the TD collapse value is set.

6. A selective call receiver for conserving power having a first battery saving period, comprising:

a receiver for receiving and obtaining synchronization to selective call signals having a multiplicity of frames;

a synchronizer for determining a first occurrence of a preassigned frame of the multiplicity of frames;

the receiver receiving the preassigned frame of the multiplicity of frames, each of the multiplicity of frames has a system collapse value for designating a second battery saving period, and a TD collapse bit and a TD collapse value for designating third battery saving period;

a decoder/controller decodes the TD collapse bit, the TD collapse value and the system collapse value being transmitted in the selective call signals, the decoder/controller calculates the third battery saving period from the TD collapse value; and a battery save selector selects between the second battery save period and the third battery saving period in response to the TD collapse value when the TD collapse bit.

7. The selective call receiver according to claim 6 wherein the battery save selector selects the second battery saving period when the TD collapse bit is set and the TD collapse value is absent.

8. The selective call receiver according to claim 6 wherein the battery save selector selects the first battery saving period when the first battery saving period is more frequent than the second battery saving period and when the TD collapse bit is not set.

9. The selective call receiver according to claim 6 wherein the battery save selector selects the second battery saving period when the second battery saving period is more frequent than the first battery saving period and when the TD collapse bit is not set.

10. The selective call receiver according to claim 6 wherein the battery save selector selects the third battery saving period designated by the TD collapse bit value when the TD collapse value is set.

11. In a selective call receiver for conserving power having a first battery saving period, a method for selecting battery saving periods, comprising the steps of:

receiving and obtaining synchronization to selective call signals having a multiplicity of frames;

determining a first occurrence of a preassigned frame of the multiplicity of frames;

receiving the preassigned frame of the multiplicity of frames, each of the multiplicity of frames has a system collapse value for designating a second battery saving period, and a TD collapse bit and a TD collapse value for designating third battery saving period;

decoding the TD collapse bit, the TD collapse value and the system collapse value being transmitted in the selective call signals;

calculating the third battery saving period from the TD collapse value; and selecting the third battery saving period designated by the TD collapse value when the TD collapse bit is set, said step of selecting selects the second battery saving period when the TD bit is set and the TD collapse value is absent.

12. A selective call receiver for conserving power having a first battery saving period, comprising:
- a receiver for receiving and obtaining synchronization to selective call signals having a multiplicity of frames;
- a synchronizer for determining a first occurrence of a preassigned frame of the multiplicity of frames;
- the receiver receiving the preassigned frame of the multiplicity of frames, each of the multiplicity of frames has a system collapse value for designating a second battery saving period, and a TD collapse bit and a TD collapse value for designating third battery saving period;
- a decoder/controller decodes the TD collapse bit, the TD collapse value and the system collapse value being transmitted in the selective call signals, the decoder/controller calculates the third battery saving period from the TD collapse value; and
- a battery save selector selects the third battery saving period designated by the TD collapse value when the TD collapse bit is set, said battery save selector selects the second battery saving period when the TD collapse bit is set and the TD collapse value is absent.

* * * * *